United States Patent [19]

Smith

[11] Patent Number: 4,498,710

[45] Date of Patent: Feb. 12, 1985

[54] DUAL BRAKE VALVES

[75] Inventor: Robert J. Smith, Blackwood, Wales

[73] Assignee: Lucas Industries public limited Company, Birmingham, England

[21] Appl. No.: 475,524

[22] Filed: Mar. 15, 1983

[30] Foreign Application Priority Data

Mar. 17, 1982 [GB] United Kingdom ............... 8207834

[51] Int. Cl.³ ............................................. B60T 15/04
[52] U.S. Cl. .................................. 303/6 R; 303/28; 303/52
[58] Field of Search ............. 303/52, 54, 56, 50, 303/28, 6 R, 6 A, 8, 29, 30, 40; 137/627.5

[56]  References Cited

U.S. PATENT DOCUMENTS

| | | | |
|---|---|---|---|
| 3,207,561 | 9/1965 | Bueler | 303/52 |
| 3,219,396 | 11/1965 | Bueler | 303/52 |
| 3,861,761 | 1/1975 | Siebold et al. | 303/52 |
| 3,992,065 | 11/1976 | Pekrul | 303/52 X |
| 4,010,983 | 3/1977 | Coupland | 303/52 X |

FOREIGN PATENT DOCUMENTS 732959  6/1955  United Kingdom .

Primary Examiner—Douglas C. Butler
Attorney, Agent, or Firm—Scrivener Clarke Scrivener and Johnson

[57]   ABSTRACT

A dual brake valve assembly for use in fluid pressure-operated vehicle braking systems embodying two independent braking circuits comprises a housing provided with sets of primary and secondary ports associated respectively with the two braking circuits and each consisting of a supply port for connection to a source of fluid under pressure and a delivery port for connection to a brake actuator, an exhaust, and two co-axial primary and secondary valves which are operative, when actuated, to isolate the delivery ports from the exhaust and connect them to the respective supply ports. A primary piston operates the primary valve directly and acts through the primary valve and a secondary piston to operate the secondary valve. The secondary piston is provided with passages through which the respective supply and delivery ports of each set are placed in communication when the respective primary and secondary valves are operated.

4 Claims, 1 Drawing Figure

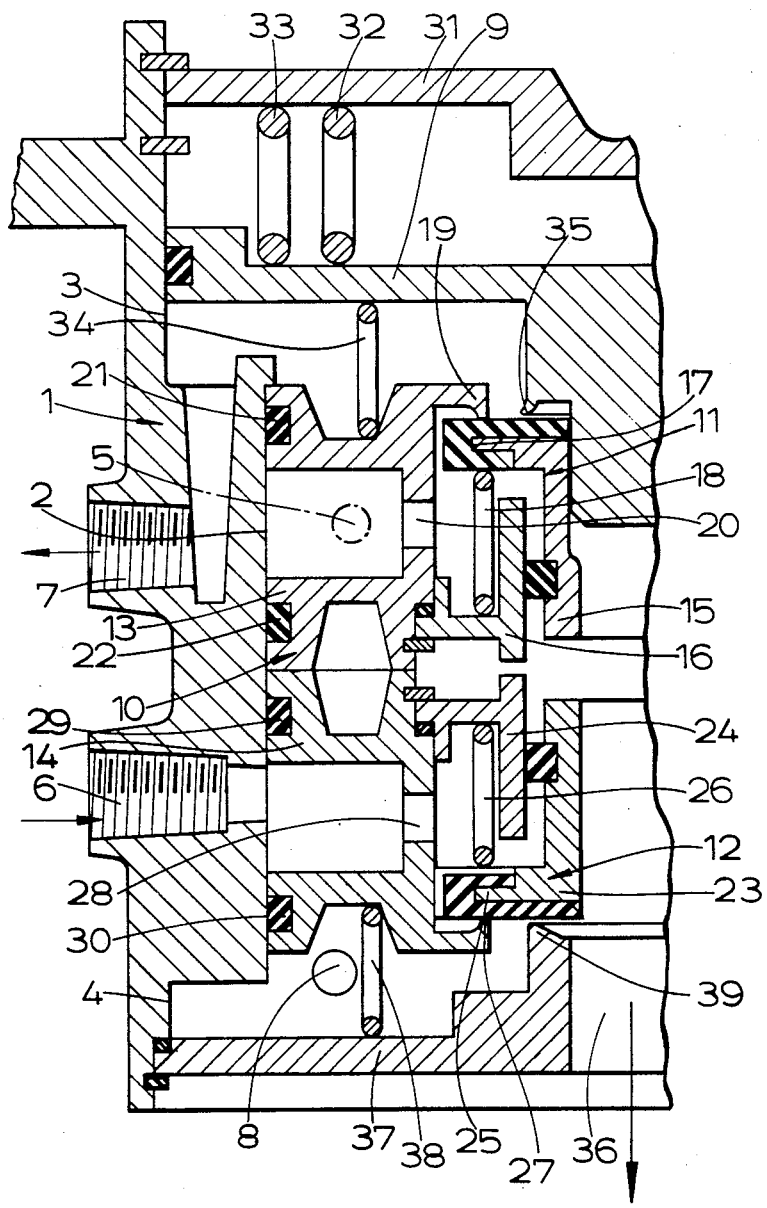

DUAL BRAKE VALVES

SPECIFIC DESCRIPTION

This invention relates to a dual brake valve assembly for use in fluid pressure-operated vehicle braking systems embodying two independent braking circuits, the valve assembly being of the kind comprising a housing provided with sets of primary and secondary ports associated respectively with the two braking circuits and each consisting of a supply port for connection to a source of fluid under pressure and a delivery port for connection to a brake actuator, an exhaust, and two co-axial primary and secondary valves which are operative when actuated to isolate the delivery ports from the exhaust and connect them to the respective supply ports.

Known brake valve assemblies of the kind set forth incorporate primary and secondary pistons for controlling operation of the primary and secondary co-axial valves respectively, with the fluid under pressure supplied to the primary delivery port which is controlled by the primary valve being applied to the secondary piston through a passage in the housing in order to affect operation of the secondary valve.

According to our invention in a dual brake valve assembly of the kind set forth a primary piston operates the primary valve directly and acts through the primary valve and a secondary piston to operate the secondary valve, the secondary piston being provided with passage means through which the respective supply and delivery ports of each set are placed in communication when the respective primary and secondary valves are operated.

This simplifies the construction since no additional ports or other passages have to be provided in the housing to affect operation of the secondary piston by means of fluid under pressure.

When both valves are operated opposite ends of the secondary piston are exposed to the pressure in the primary and secondary delivery ports so that valve assembly is held in a balanced position.

The secondary valve is carried by the secondary piston, and the primary valve may also be carried by the secondary piston. When both valves are carried by the secondary piston this provides a sub-assembly which facilitates manufacture since the secondary piston with both valves so installed can be inserted into a bore in the housing in which the secondary piston works and which is common with the bore in which the primary piston works.

Since our valve assembly does not depend on the generation of a pressure for operating the second valve it follows that the valve assembly is operable to provide low pressure differentials.

The housing may be constructed from a one-piece component, suitably a casting, into opposite ends of which the primary and secondary pistons are adapted to be inserted to work in the common bore in the housing, and the ends of the housing are closed by closure members of which the member adjacent to the primary piston is guided to slide in the bore and acts as a pressure plate to transmit an actuating force to the primary piston through at least one spring, and the member adjacent to the secondary piston is rigid with the housing and is provided with a central aperture defining the exhaust port and around which is defined a seating for engagement with a valve member of the secondary valve.

One embodiment of our invention is illustrated in the single FIGURE of the accompanying drawings which is a longitudinal section through substantially one half of a dual brake valve assembly for use in a fluid pressure-operated vehicle braking system.

The dual brake valve illustrated in the drawings comprises a housing 1 which is provided with longitudinally extending bore 2 having counterbored portions 3 and 4 at its opposite ends.

The housing 1 is provided with axially spaced primary and secondary supply ports 5 and 6 connected to different sources or to a common source of pneumatic pressure, and with complementary primary and secondary delivery ports 7 and 8 connected to the actuators of different or common brakes to form different braking circuits.

A primary piston 9 works in the counterbore 3, and a secondary piston 10 of annular outline works in the bore 2.

Primary and secondary valves 11 and 12 are carried by the secondary piston 10, being located in a central through-bore. As illustrated the piston 10 comprises a symmetrical assembly of upper and lower components 13 and 14. The primary valve 11 is carried by the upper component 13 and the secondary valve 12 is carried by the lower component 14.

The primary valve 11 comprises a hollow valve member 15 of top-hat section which is guided to slide in a cylindrical guide 16 carried by the component 13. The member 15 has a radial valve head 17 which is normally urged by a spring 18 into engagement with a seating 19 defined by the inner face of an inwardly directed radial flange at the end of the component 13 which is adjacent to the primary piston 9. In that inoperative position the engagement of the head 17 with the seating 19 isolates the primary supply port 5 from the primary delivery port 7 through a communicating radial passage 20 in the component 13. The passage 20 is disposed between axially spaced seals 21 and 22 which are carried by the component 13 and sealingly engaged slidably with the bore 2.

The secondary valve comprises a hollow valve member 23 of top-hat section which is guided to slide in a cylindrical guide 24 carried by the component 14. The member 23 has a radial valve head 25 which is normally urged by a spring 26 into engagement with a seating 27 defined by the inner face of an inwardly directed radial flange at the end of the component 14 which is adjacent to the counterbore 4. In that inoperative position the engagement of the head 25 with the seating 27 isolates the secondary supply port 6 from the secondary delivery port 8 through a communicating radial passage 28 in the component 14. The passage 28 is disposed between axially spaced seals 29 and 30 which are carried by the component 14 and sealingly engage slidably with the bore 2.

A pressure plate 31 for receiving a brake actuating force is guided to slide in a portion of the counterbore 3 on the side of the primary piston 9 which is remote from the secondary piston 10, and the pressure plate 31 acts on the primary piston 9 through a pair of concentric graduating springs 32 and 33.

The primary piston 9 is urged away from the secondary piston 10 by means of a compression spring 34 and in an inoperative position determined by the spring 34 a valve seating 35 on the primary piston 9 is spaced from the valve head 17 to place the delivery port 7 in communication with an exhaust port 36 at the opposite end of the housing 1, through the communicating bores of the valve members 15 and 23.

Similarly, the secondary piston 10 is urged away from a closure plate 37 at the end of the housing 1 remote from the plate 31 by means of a compression spring 38 and this acts to hold the valve head 25 away from a seating 39. The seating 39 surrounds a central aperture in the plate 37 which defines the exhaust port 36. In that position therefore the secondary delivery port 8 is placed in communication with the exhaust port 36, since the port 8 issues into a chamber defined between the piston 10 and the plate 37.

In the inoperative position shown in the drawings, as described above the supply ports 5 and 6 are isolated from the corresponding delivery ports 7 and 8 by the closed primary and secondary valves 11 and 12, and the delivery ports 7 and 8 are in communication with the exhaust port 36.

When the pressure plate 31 is depressed, for example by foot pressure, that force is transmitted to the primary piston 9 through the graduated springs 32 and 33. The piston 9 moves inwardly and the seating 35 engages with the head 17, initially to isolate the delivery port 7 from the exhaust port 36, and subsequently, through the spring 34, to urge the secondary piston 10 downwardly until the head 25 engages with the seating 39 to isolate the delivery port 8 from the exhaust port 36. Further displacement of the primary piston 9 causes the two valve heads 17 and 25, and the seatings 19 and 27 to move relatively away from each other simultaneously so that the supply and delivery ports 5, 7 and 6, 8 are placed in communication with each other through the respective communicating passages 20 and 28. Theoretically this gives substantially no pressure differential.

The valve balance is maintained by the pressures in the two delivery ports 7 and 8 acting on opposite ends of the secondary piston 10. The valve loading can be substantially high provided the balance is maintained.

Priority can be given to either system by selecting suitable loadings for the springs 18 and 26 such that the valves 11 and 12 can be operated sequentially.

I claim:

1. A dual brake valve assembly for use in fluid pressure-operated vehicle braking systems embodying two independent braking circuits, said valve assembly comprising a housing provided with a bore and with sets of primary and secondary ports associated respectively with the two braking circuits and each said set of ports comprising a supply port for connection to a source of fluid under pressure and a delivery port for connection to a brake actuator, an exhaust, two co-axial primary and secondary valves which are operative when actuated to isolate said delivery ports from said exhaust and connect said delivery ports to the said respective supply ports, a primary piston working in said bore in said housing, and a secondary piston also working in said bore in said housing, wherein said primary piston operates said primary valve directly and acts through said primary valve and said secondary piston to operate said secondary valve, and said secondary piston is provided with a through-bore in which said primary and secondary valves are located, said through-bore providing communication between said respective supply and delivery ports of each said set when said respective supply and delivery valves are operated, and each said valve comprising a hollow valve member which is guided to slide in said through-bore, a seating at an adjacent end of said through-bore, and a spring normally urging said valve member into engagement with said seating whereby said valves isolate said supply ports from said delivery ports, and wherein passage means defined through said hollow valve members and a communicating portion of said through-bore provide communication between said primary delivery port and said exhaust when said valve assembly is in an inoperative position, in which said inoperative position said secondary delivery port communicates directly with the said exhaust which is common to both braking circuits.

2. A valve assembly as claimed in claim 1, wherein said secondary piston comprises first and second separate components, said primary valve is carried by said first component, said secondary valve is carried by said second component, and each said component is provided with a pair of axially spaced seals which are sealingly engaged slidably in said bore in said housing in which said secondary piston is adapted to work, said first component being provided with a first passage disposed between the said seals in that component to provide communication between said primary supply port and said primary delivery port when said primary valve is operated, and second said second component being provided with a second passage disposed between said seals in that component to provide communication between said secondary supply port and said secondary port when said secondary valve is operated.

3. A valve assembly as claimed in claim 1, wherein primary and secondary valve guides are carried by said secondary piston, said primary valve member is guided to slide in said primary valve guide, and said secondary valve which is guided to slide in said secondary valve guide.

4. A valve assembly as claimed in claim 1, wherein said primary and secondary pistons are adapted to be inserted into opposite ends of said bore in said housing, a first closure member for said end of said bore adjacent to said primary piston is guided to slide in said bore, at least one spring acts between said first closure member and said primary piston to transmit an actuating force to said primary piston from said first closure member when said first closure member acts as a pressure plate, and a second closure member for said end of said bore adjacent to said secondary piston is rigid with said housing and is provided with a central aperture defining said exhaust and around which is defined an exhaust seating with which said secondary valve is adapted to co-operate.

* * * * *